Patented Feb. 18, 1947

2,416,035

UNITED STATES PATENT OFFICE 2,416,035

GYPSUM COMPOSITIONS CAPABLE OF SETTING AT ELEVATED TEMPERATURES

William A. Whittier, Glenview, Ill., assignor to United States Gypsum Company, Chicago, Ill., a corporation of Illinois No Drawing. Application September 21, 1944, Serial No. 555,202

8 Claims. (Cl. 106—89)

The present invention relates to special calcined gypsum compositions which contain ingredients that enable them to set within a reasonable period of time even though they are maintained at temperatures in excess of about 130° F.

It has long been desirable to produce calcined gypsum compositions which when gauged with water will set in a reasonable time even though the slurry resulting from such admixture is maintained at elevated temperatures, say from about 130° F. to about 175° to 190° F. Conditions under which such temperatures may be encountered are in hot climates, and particularly in the bottom of deep wells where it has become customary to employ gypsum slurries for the purpose of cementing oil wells and the like.

Thus it has already been proposed in accordance with the patents of Andrew C. Hamilton, Jr., Nos. 2,191,652 and 2,210,545, to cement off oil wells by introducing thereinto calcined gypsum compositions of such controlled rates of setting that the slurries will set at about the time that the slurry reaches the formation in the earth where the break in the well has occurred.

In some of these patents the accelerator is so balanced against the retarder that a predetermined setting time can be relied upon. In another of these patents a retarded composition is pumped into a well and accelerator is then added in constantly increasing amounts until the setting time has been so shortened or adjusted that the slurry will set at about the time it reaches the break in the well.

Now it is a fact that the temperatures in rather deep wells are higher than they are at the surface of the earth. It is well known that the further one penetrates into the earth, the higher are the temperatures encountered, and in some of the more modern and deep oil wells, temperatures as high as 170° F. and sometimes even higher are not uncommon. It is self evident that if a gypsum composition is adversely effected as to its setting time as a result of getting into a zone of such high temperatures this will be a very undesirable condition, as thus the setting will be substantially prevented.

Moreover, it has been known for a long time that gypsum compositions are prevented from setting by high temperature environment and in fact advantage is taken of this retardation of set by elevated temperatures in producing gypsum castings. See for example the patent to Chassevant No. 1,672,638.

Applicant has now discovered that he can substantially immunize calcined gypsum slurries against the retarding effect of high temperatures, that is to say, for example, within the range of from about 130 to 190° F., by incorporating therewith relatively small amounts of certain carbonates, particularly those carbonates selected from the group consisting of the normal and basic carbonates of magnesium, nickel and zinc. It is not known just what the chemical reaction might be and perhaps the effect is explainable only on the basis of some form of catalysts. The empirical fact remains, however, as shown by a large number of tests, that the enumerated carbonates are capable of offsetting the retarding effect of heat on a calcined gypsum slurry.

It is of course well known that in setting, calcined gypsum, which is the calcium sulfate hemihydrate, $CaSO_4 \cdot \frac{1}{2}H_2O$, will unite with water to reform ordinary gypsum, namely the calcium sulfate dihydrate, $CaSO_4 \cdot 2H_2O$.

This reaction can be accelerated and retarded to a considerable extent. Thus the use of so-called commercial retarders, which in general are proteinaceous materials such for example as are produced from keratin by hydrolysis and admixture of the product with lime, will retard the set of gypsum to a considerable period, say up to 5 or 6 hours. On the other hand, the setting of a slurry of calcined gypsum can be accelerated by a number of materials, among the best of which are seed crystals of calcium sulfate dihydrate which may be supplied to the mixture either in the form of ground raw gypsum or formed in the mixture by metathesis from such substances as aluminum sulfate and a calcium hydroxide-yielding alkaline reacting material such as lime or Portland cement, etc. These seed crystals, by accelerating the material, more or less offset the retarding effect of the retarder. By having both the materials present in balanced amounts, the gypsum is thereby more or less stabilized against changes in its setting rate, due to adventitious admixtures. However, its setting time will still be influenced by a rise in temperature.

The present invention, however, cures that portion of the defect which lies in the lengthening of the setting time due to operating at high temperatures. Applicant has found that by mixing with the calcined gypsum relatively small amounts of either the normal or basic carbonates of magnesium, nickel or zinc, that he can render the composition capable of setting just about as fast or at least reasonably fast, even though the temperature to which the mixture is raised is above 130° F., and say up to 190° F.

Purely for purposes of exemplification, a number of examples will now be given to illustrate the method of applying the present invention:

EXAMPLE 1

This example describes two mixtures, the first of which is merely the prior art material, while the second is a material coming within the scope of the present invention.

Mixture No. 1 is as follows:

| | |
|---|---|
| Alpha gypsum | 2000 |
| Portland cement | 10 |
| Raw gypsum | 5 |
| Rochelle salt | 0.5 |

Mixture No. 2 is as follows:

| | |
|---|---|
| Alpha gypsum | 2000 |
| Portland cement | 10 |
| Raw gypsum | 5 |
| Rochelle salt | 0.5 |
| Basic magnesium carbonate | 0.75 |

In the above mixtures alpha gypsum is a special high strength gypsum made in accordance with patent to Randell and Dailey No. 1,901,051.

Mixture No. 1 and mixture No. 2 were tested under identical conditions, in each case gauging 100 parts by weight of the mixture with 45 parts by weight of water, and then pouring the mixture into a suitable vessel, in which the setting time could be accurately ascertained, and also in which certain temperatures could be accurately maintained. The results were as follows:

| Mixture No. | Setting time of slurry at 76° F. | Setting time of slurry at 170° F. |
|---|---|---|
| | Minutes | Minutes |
| 1 | 97 | 143 |
| 2 | 98 | 30 |

It will be seen from the above test that the addition of magnesium carbonate to the composition shown actually even accelerated the setting time at 170° F., while the setting time of the composition containing no basic magnesium carbonate was retarded up to 143 minutes, as against a set of 97 minutes at 76° F.

Similar results can be obtained by the use of normal or basic carbonates of zinc and nickel. Examples of these are given hereinbelow.

EXAMPLE 2

Two different base mixtures were employed, marked respectively base mixture No. 3 and base mixture No. 4, which were as follows:

| | Base mixture #3 | Base mixture #4 |
|---|---|---|
| | Pounds | Pounds |
| Calcined gypsum | 2,000 | 2,000 |
| Portland cement | 20 | 10 |
| Gum arabic | 8 | |
| Commercial retarder | 1.2 | |
| Raw gypsum | 10 | 5 |
| Rochelle salt | | 0.6 |
| Additive | 25 | 25 |

These mixtures were then tested at 70° F. and 150° F. with the results shown in Table I.

Table I

| Additive | Base mixture 3 set at— | | Base mixture 4 set at— | |
|---|---|---|---|---|
| | 70° F. | 150° F. | 70° F. | 150° F. |
| | Minutes | Minutes | Minutes | Minutes |
| Basic magnesium carbonate | 73 | 73 | 69 | 42 |
| Nickelous carbonate | 53 | 67 | 39 | 63 |
| Zinc carbonate (basic) | 60 | 160 | 45 | 15 |
| No additive | 69 | [1] 420 | 62 | [1] 420 |

[1] No set.

In the above mixture the commercial retarder was the ordinary well known retarder material made from hydrolized keratin and line. The other materials are of course self-explanatory.

Particular attention is directed to the fact that as shown in Table I, the setting time of mixture 3 with basic magnesium carbonate was the same at 150° F. as it was at 70° F. while with mixture 4, the setting time at the higher temperature was actually less.

With nickelous carbonate with mixture 3, the difference was about 14 minutes at the higher temperature, and the same with mixture 4.

Zinc carbonate, while effective, is not as good as the basic magnesium carbonate, the increase being roughly 100 minutes at the higher temperature. Note, however, that where no additive was used, and the material would set as to mixture 3 in 69 minutes at 70° F., and as to mixture 4 in 62 minutes at 70° F., there was no set at all at 150° F., even at 420 minutes, that is to say 7 hours.

In general it has been found that the effectiveness of the temperature range at which the material can be made to set runs up as high as 190° F., which is not very far below the boiling point of water. In other words, when using the present invention, not much attention need be paid to temperature conditions. Thus, when operating in very hot regions of the earth, like in the Near East or in Southern Arabia, these mixtures would work, while without the additive materials they would be quite useless. The same thing is true in working anywhere where by reason of the depth of the well the earth temperature lies within the ranges herein described.

The methods of compounding the material are simple, and the carbonate additive may be merely physically admixed with the gypsum and the other set controlling ingredients. It is to be noted, however, that even when no set controlling ingredients at all are employed, the stated type of normal or basic carbonates will still exert their effect of overcoming the retarding effect of heat.

As an obvious modification it may be mentioned that the addition of the normal or basic carbonate may be accomplished by first mixing it with the gauging water and then using the suspension of these carbonates to gauge the gypsum cement composition. This is an advantageous way of proceeding where shipments are made for use of the well sealing material under conditions where sometimes the temperatures are such that the carbonate additives are not needed; therefore the operators can stir it into the gauging water and thus get it into quite uniform mixture with the slurry when needed.

As a still further alternative the additive may be admixed with the gypsum cement composition at the time the slurry is prepared, that is to say, it may be sprinkled or poured into the slurry during the gauging operation.

In other words, it is to be emphasized that the manner of addition of the carbonate additive is a matter of no great concern.

As to the quantities, it has been found by experiment that from ½ of 1% up to 5% based on the weight of the active setting material, that is to say, the calcined gypsum, is the most effective range. Larger amounts may of course be used, but do not add very much to the effect, and naturally are more expensive.

Ordinarily, compositions such as those shown in the mixtures numbered 2 through 4, with the amounts of the additives as therein shown, are to be considered as the preferred forms of the present invention, for which applicant claims:

1. A cementitious composition capable of setting at temperatures above about 130° F. comprising as its major reactive ingredient over 90% by weight of calcium sulfate hemihydrate, and from about 0.25 to about 5% by weight of a carbonate selected from the group consisting of the normal and basic carbonates of magnesium, nickel and zinc.

2. A calcined gypsum composition whose setting time is not much delayed by temperatures in excess of about 130° F. which comprises at least 90% by weight of calcined gypsum and from about 0.25% to about 5% of a carbonate selected from the group consisting of the normal and basic carbonates of magnesium, nickel and zinc.

3. Process of preventing the retardation of a calcined gypsum slurry whose solids content comprises over 90% by weight of calcined gypsum by temperatures of about 130° F. and higher which comprises incorporating with the gypsum slurry at any stage of its formation about 0.25% to about 5%, on the basis of the weight of the calcined gypsum in said slurry, of a carbonate selected from the group consisting of the normal and basic carbonates of magnesium, nickel and zinc.

4. A calcined gypsum composition suitable for cementing oil wells, and not adversely affected as to its setting time by temperatures above about 130° F., comprising over 90% of calcined gypsum and from about 0.25% to about 5.0% of a carbonate selected from the group consisting of the normal and basic carbonates of magnesium, nickel and zinc, the remainder consisting of a mixture of set control reagents.

5. A calcined gypsum composition suitable for cementing oil wells and not adversely affected as to its setting time by temperatures above about 130° F., which comprises a mixture of about 2000 parts by weight of calcined gypsum, from about 10 to 20 parts of Portland cement, from about 5 to 10 parts of uncalcined gypsum, from about 0.0 to 0.6 parts of Rochelle salts, and about 25 parts of a carbonate selected from the group consisting of the normal and basic carbonates of magnesium, nickel and zinc.

6. Process of overcoming the retarding effect of temperatures from about 130° F. to about 190° F. upon cementitious slurries whose solids content comprises over 90% by weight of calcined gypsum which comprises the incorporation therewith at any stage of their production of small amounts of basic magnesium carbonate.

7. Process of overcoming the retarding effect of temperatures from about 130° F. to about 190° F. upon cementitious slurries whose solids content comprises over 90% by weight of calcined gypsum which comprises the incorporation therewith at any stage of their production of small amounts of nickelous carbonate.

8. Process of overcoming the retarding effect of temperatures from about 130° F. to about 190° F. upon cementitious slurries whose solids content comprises over 90% by weight of calcined gypsum which comprises the incorporation therewith at any stage of their production of small amounts of basic zinc carbonate.

WILLIAM A. WHITTIER.

REFERENCES CITED

The following references are of record in the file of this patent:

UNITED STATES PATENTS

| Number | Name | Date |
|---|---|---|
| 397,529 | Wooster | Feb. 12, 1889 |
| 1,620,915 | Parkhurst | Mar. 15, 1927 |
| 1,901,054 | Dailey | Mar. 14, 1933 |
| 2,078,200 | King | Apr. 20, 1937 |
| 2,292,616 | Dailey | Aug. 11, 1942 |

FOREIGN PATENTS

| Number | Country | Date |
|---|---|---|
| 2,467 | British | 1905 |

---

Certificate of Correction

Patent No. 2,415,647.                                                                February 11, 1947.

ROGER A. MacARTHUR ET AL.

It is hereby certified that error appears in the printed specification of the above numbered patent requiring correction as follows: Column 3, line 13, for the patent number "335,242" read *2,335,242*; and that the said Letters Patent should be read with this correction therein that the same may conform to the record of the case in the Patent Office.

Signed and sealed this 22nd day of April, A. D. 1947.

[SEAL]

LESLIE FRAZER,
*First Assistant Commissioner of Patents.*

Certificate of Correction

Patent No. 2,416,035.　　　　　　　　　　　　　　　February 18, 1947.

WILLIAM A. WHITTIER

It is hereby certified that errors appear in the printed specification of the above numbered patent requiring correction as follows: Column 2, line 7, for "catalysts" read *catalysis*; column 3, line 72, Table 1, last column thereof, for "15" read *150*; column 4, line 3, for "line" read *lime*; and that the said Letters Patent should be read with these corrections therein that the same may conform to the record of the case in the Patent Office.

Signed and sealed this 22nd day of April, A. D. 1947.

[SEAL]

LESLIE FRAZER,
*First Assistant Commissioner of Patents.*